United States Patent
Chengalva et al.

(10) Patent No.: US 11,775,253 B2
(45) Date of Patent: Oct. 3, 2023

(54) USER-TRACKING SYSTEM

(71) Applicants: Shravan S. Chengalva, Westfield, IN (US); Aditya K. Chengalva, Westfield, IN (US); Anupama Chengalva, Westfield, IN (US)

(72) Inventors: Shravan S. Chengalva, Westfield, IN (US); Aditya K. Chengalva, Westfield, IN (US); Anupama Chengalva, Westfield, IN (US)

(*) Notice: Subject to any disclaimer, the term of this patent is extended or adjusted under 35 U.S.C. 154(b) by 54 days.

(21) Appl. No.: 17/161,632

(22) Filed: Jan. 28, 2021

(65) Prior Publication Data
US 2022/0235783 A1    Jul. 28, 2022

(51) Int. Cl.
G01S 17/06    (2006.01)
F04D 27/00    (2006.01)
G05D 3/12    (2006.01)
G06F 3/16    (2006.01)

(52) U.S. Cl.
CPC ........... *G06F 3/167* (2013.01); *F04D 27/004* (2013.01); *G01S 17/06* (2013.01); *G05D 3/128* (2013.01); *G06F 3/165* (2013.01)

(58) Field of Classification Search
CPC ........ F04D 27/004; G01S 17/06; G05D 3/128
See application file for complete search history.

(56) References Cited

U.S. PATENT DOCUMENTS 6,537,029 B1    3/2003    Chen-Lung et al.

FOREIGN PATENT DOCUMENTS

| CN | 210686371 U | * | 6/2020 | |
| JP | 2012117418 A | * | 6/2012 | |
| JP | 2019094855 A | * | 6/2019 | ........... F04D 25/105 |
| KR | 20160049796 A | * | 5/2016 | ............. H04W 4/60 |
| WO | WO-2008014641 A1 | * | 2/2008 | ........... F04D 25/105 |
| WO | WO-2017152833 A1 | * | 9/2017 | ............. F04D 27/00 |
| WO | WO-2018027672 A1 | * | 2/2018 | ............. F04D 25/10 |
| WO | WO-2018076767 A1 | * | 5/2018 | ........... F04D 27/004 |
| WO | WO-2020256236 A1 | * | 12/2020 | |

* cited by examiner

*Primary Examiner* — Juan G Flores
*Assistant Examiner* — Jason G Davis
(74) *Attorney, Agent, or Firm* — Lewis Roca Rothgerber Christie LLP

(57) ABSTRACT

A system for tracking a user. In some embodiments, the system includes a user-tracking circuit, configured to determine a direction to the user, and a pointing control circuit, for causing a payload to be aimed based on the direction to the user.

18 Claims, 2 Drawing Sheets

USER-TRACKING SYSTEM

FIELD

One or more aspects of embodiments according to the present disclosure relate to a system for tracking a user.

BACKGROUND

In various circumstances in which a user works with a piece of assisting equipment, such as a light or a fan, it may be advantageous for the equipment to be aimed at the user. If the user moves while working, however, the direction in which the equipment is aimed may need to be adjusted. Similarly, it may be advantageous for the equipment to follow the user if the user moves away from the equipment, and to adjust the level of operation of the equipment depending on the distance to the user.

Thus, there is a need for a system for adjusting a piece of equipment for a user.

SUMMARY

According to an embodiment of the present invention, there is provided a system, including: a user-tracking circuit, configured to determine a direction to a first user; and a pointing control circuit, for causing a payload to be aimed based on the direction to the first user.

In some embodiments, the system includes an oscillating fan including: a fan motor; a clutch; and a pointing drive gear mechanically connected to the fan motor through the clutch, wherein the pointing control circuit is configured to cause the clutch to be engaged or disengaged.

In some embodiments, the system further includes a first pointing control actuator electrically connected to the pointing control circuit and mechanically connected to the payload, wherein the first pointing control actuator is configured to rotate the payload about a first axis.

In some embodiments, the payload includes a light.

In some embodiments, the payload includes a loudspeaker.

In some embodiments: the user-tracking circuit is further configured to determine a direction to a second user; and the pointing control circuit is further configured to cause the payload to be aimed, alternately, based on the direction to the first user and based on the direction to the second user.

In some embodiments, the system further includes a command receiving circuit, and an operation control circuit, wherein the command receiving circuit is configured to receive a command from the first user, and the operation control circuit is configured to control an operating parameter of the payload.

In some embodiments: the payload includes a fan, and the operating parameter is a speed of the fan.

In some embodiments: the payload includes a loudspeaker, and the operating parameter is a volume of the loudspeaker.

In some embodiments, the user-tracking circuit is configured to determine a direction to a user device held by the first user.

In some embodiments, the operation control circuit is configured to reduce the level of operation of the payload when no signal is detected from the user device.

In some embodiments, the system further includes the user device, wherein the user device is a smart phone.

In some embodiments, the user-tracking circuit is configured to detect electromagnetic radiation emitted by the user device.

In some embodiments, the electromagnetic radiation is radio-frequency or microwave radiation.

In some embodiments, the electromagnetic radiation is configured to transport data.

In some embodiments, the user-tracking circuit is configured to receive, in the data, a location of the user.

In some embodiments, the user-tracking circuit is further configured to determine a distance to the first user.

In some embodiments, the system further includes a position control circuit and a position actuator, wherein the pointing control circuit is configured to cause the position actuator to move the system to reduce the distance to the first user.

In some embodiments, the system further includes a battery configured to power the system.

In some embodiments, the system further includes a microphone and a voice-processing circuit for receiving voice commands.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system for adjusting a piece of equipment for a user provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

A stationary or oscillating fan may be used to cool a person, or "user" or to provide ventilation. For example, a user painting a wall may wish to be cooled by air from a fan, or may wish to have the fan disperse volatile components of the paint to minimize exposure to them. In such a situation, the user may turn on a fan and aim it at the portion of the wall currently being painted. However, each time the user has completed the painting of a portion of the wall, it may be necessary to re-aim the fan when proceeding to the next portion to be painted. This may be a significant inconvenience for the user. The use of an oscillating fan, which may swing back and forth, directing a flow of air over a larger area, may partially mitigate this problem, but the use of an oscillating fan may have the disadvantage that the user may benefit from the direct stream of air only during a small fraction of the time, e.g., twice for each oscillation cycle of the fan.

Figure 1:
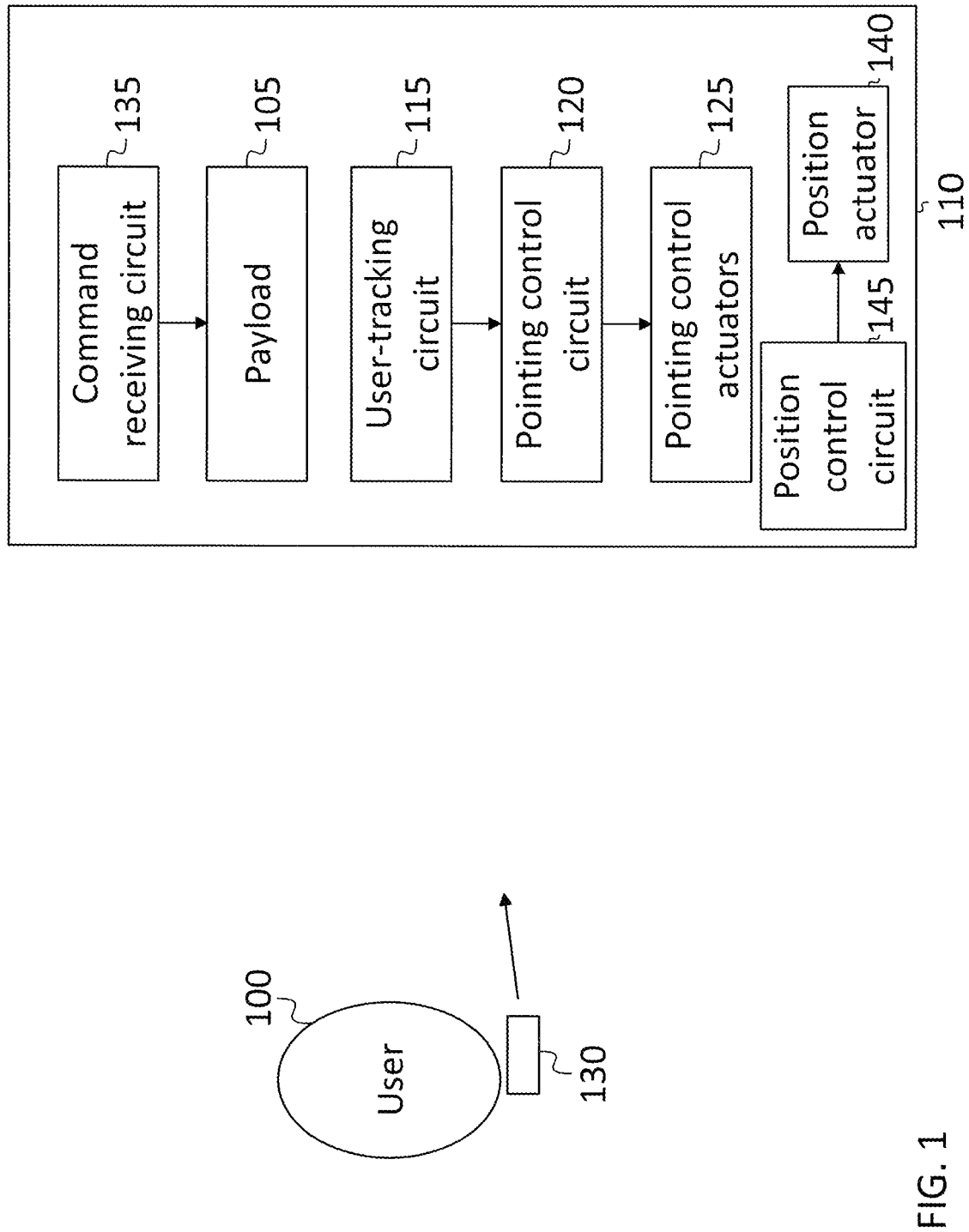
FIG. 1 is a block diagram, according to an embodiment of the present disclosure.

Referring to FIG. 1, in some embodiments, the performance of a fan is improved by a system for aiming the fan actively at the user 100. Referring to FIG. 1, in some embodiments, the fan is a payload 105 for a system 110 that actively aims the payload 105 at the user. The system includes a user-tracking circuit 115 that determines a direction to the user, and a pointing control circuit 120, for causing the payload 105 to be aimed in the direction of the user.

The payload 105 may be supported on a hinge or on one or more bearings (e.g., on a thrust bearing), making it possible for the payload 105 to be rotated in azimuth, i.e., about a vertical axis. The system may further include a pointing control actuator 125 configured to rotate the payload 105 about a first axis, e.g., the vertical axis. The pointing control actuator 125 may be, for example, a suitable gear motor mechanically connected to the payload 105, so that rotation of the gear motor causes the payload 105 to rotate about the vertical axis. In some embodiments, one or more internal bearings of the pointing control actuator 125 (e.g., bearings in a gear motor) may be the bearings that support the mass of the payload 105 and that define the vertical axis of rotation. For example, the payload may be secured to the output shaft of the gear motor, which may both support the mass of the payload 105, and enable the payload 105 to be turned.

Figure 2:
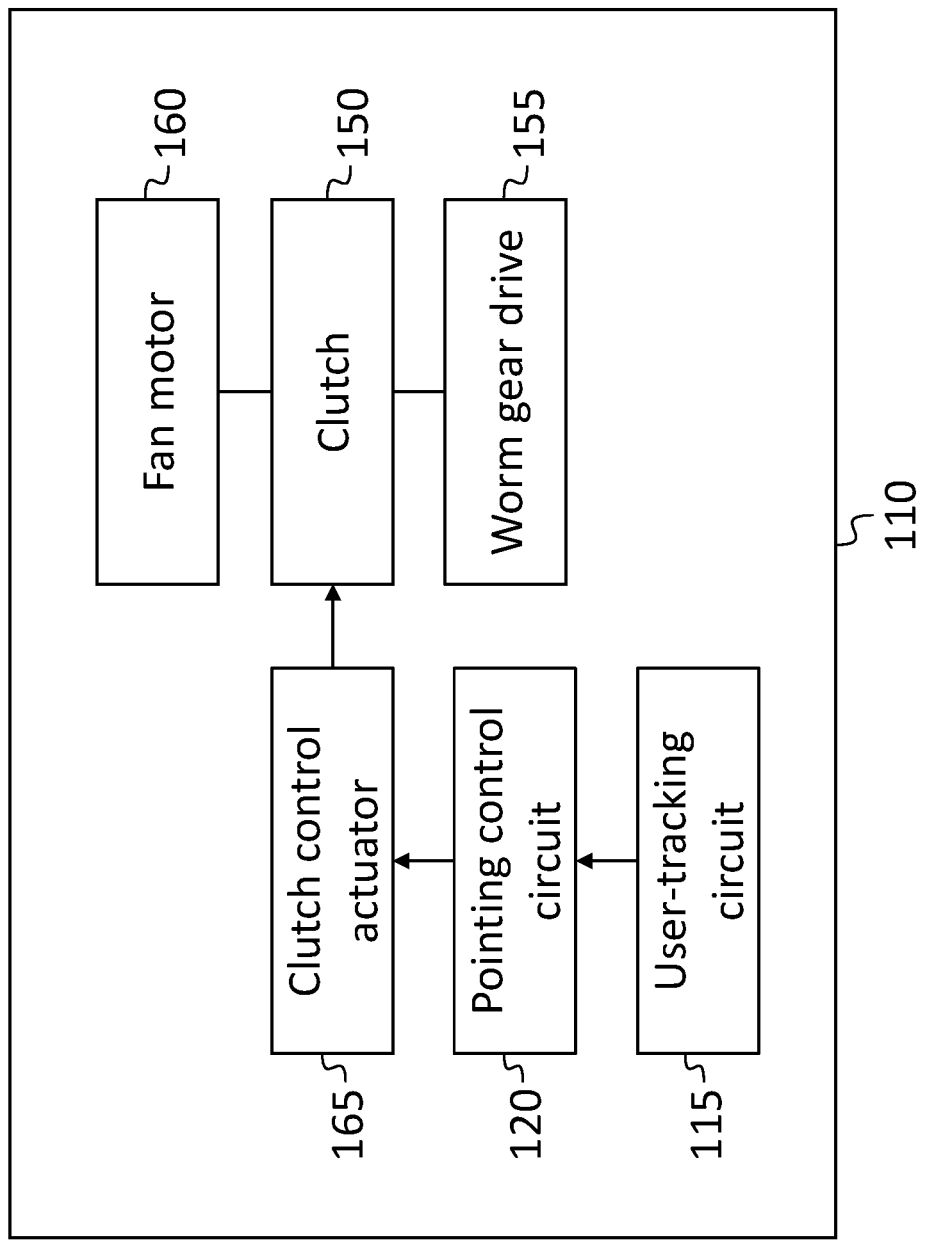
FIG. 2 is a block diagram, according to an embodiment of the present disclosure.

Referring to FIG. 2, in the case of an oscillating fan, the fan motor 160 may be connected, through a clutch 150, to a gear drive (e.g., a worm gear drive) 155, the output of which may be mechanically connected (e.g., through a linkage) to the fan motor 160, causing the fan motor (and the fan blade) to oscillate when the clutch 150 is engaged. To enable the pointing control circuit 120 to cause the fan motor to rotate in azimuth, a clutch-control actuator (e.g., a solenoid, a linear actuator, or a gear motor connected to the clutch 150 by a suitable linkage) 165 may be mechanically connected to the clutch 150, and electrically connected to the pointing control circuit 120.

The user-tracking circuit 115 may calculate the difference, or "error signal" between the direction in which the fan is aimed, and the direction to the user. The pointing-control circuit 120 may then control the pointing control actuator 125 to change the aiming of the payload so as to reduce the error signal. In the case of an oscillating fan, the error signal may be transmitted to the pointing control circuit 120, which may cause (by a suitable control signal sent to the clutch-control actuator) the clutch to be engaged, causing the fan to oscillate, when the error signal exceeds a threshold. The fan may then rotate in azimuth (possibly moving in the wrong direction initially and then turning around) until the fan is again aimed at the user, at which point the error signal (determined by the user-tracking circuit 115 and transmitted to the pointing control circuit 120) may be sufficiently small that the pointing control circuit 120 may cause the clutch to become disengaged, stopping the azimuthal motion of the fan.

Various arrangements may be used to allow the user-tracking circuit 115 to determine the direction to the user. In some embodiments, a user device 130 is held by the user 100, e.g., held in the hand of the user 100, or in the user's pocket, or strapped to the user, or clipped to a belt worn by the user, or otherwise secured to the user. As used herein, "held by the user" includes any such method of causing the user device 130 to be with, and remain with, the user. The user-tracking circuit 115 may determine the direction to the user 100 by determining the direction to the user device 130. The user device 130 may emit electromagnetic radiation (e.g., a radio frequency or microwave signal, such as a Bluetooth or WiFi signal) that is then detected by the user-tracking circuit 115. The user-tracking circuit 115 may determine the direction to the user device 130 (and, thereby, the direction to the user 100), for example by determining the direction from which the signal is received (e.g., by measuring the relative phase with which the signal is received in the array elements of an array antenna). As another example, the user device 130 may estimate the user's position (e.g., using a Global Positioning System (GPS) receiver in the user device 130, or another location-determining system, e.g., based on a mobile telephone network) and it may send the user's estimated position to the user-tracking circuit 115 (e.g., over the Bluetooth or WiFi link), which may then determine the direction to the user 100 based on the location of the user and the location of the user-tracking circuit 115 (which may similarly be known from a Global Positioning System (GPS) receiver in the user-tracking circuit 115, or from another location-determining system).

In some embodiments, the system 110 includes a command receiving circuit 135 which may receive commands (e.g., commands sent by the user device 130 in response to user input) and which may, in response, adjust a level of operation of the payload, or relay the user command to another circuit (e.g., instructing the user-tracking circuit 115 and the pointing-control circuit 120 to begin tracking, or to stop tracking, the user).

The user device 130 may be any of a variety of devices. For example, it may be a smartphone (e.g., a mobile phone with the capability to install and execute applications selected by the user 100). The user 100 may download an application on the smartphone, which may allow the user to select the system 110 to be controlled (e.g., the fan to be controlled, since user may own multiple fans). Once the user device 130 is paired to the system 110 using standard Bluetooth or WiFi technology, the user may then adjust multiple features, such as adjusting the fan speed, renaming the fan to names such as "Living Room fan", turning the fan on or off, and turning the tracking feature on or off.

As another example, the user device 130 may be a remote control, that may be, or include, a transmitter that transmits an electromagnetic signal (i.e., electromagnetic radiation) to the system 110. In such an embodiment, the user device 130 may be sufficiently small to fit in the user's pocket. In addition to providing a signal from which the user-tracking circuit 115 may determine the direction to the user 100 (as discussed above), the user device 130 in such an embodiment may be capable of transmitting commands to the command receiving circuit 135. As such, the user device 130 may also function as a traditional, manual remote, and the user may be able, for example, if the payload is a fan, to change the fan's speed and turn the fan on and off. The user device 130 may include a rechargeable battery, and the system 110 may include a charging station, on which the user device 130 may be placed, to cause the rechargeable battery to be charged.

As another example, the user device 130 may be a wearable device, e.g., a watch or a device that is strapped elsewhere on the user's body (e.g., on the user's upper arm). In such an embodiment, the user device 130 may, for example, have the functionality possible with the embodiment in which the user device 130 is a smartphone (in which case the user device 130 may be referred to as a "wearable smartphone"), or the functionality possible with the embodiment in which the user device 130 is a remote control. In some embodiments, the wearable user device 130 connects to a smartphone, and the user may download the same application that may run on the smartphone onto the wearable user device 130.

In some embodiments, the user-tracking circuit 115 includes a camera connected to a machine-vision system. The machine-vision system may identify the user in images acquired by the camera, and the user-tracking circuit 115 may determine the direction to the user from the location of the user 100 in the images.

In some embodiments, the payload 105 includes other elements, such as a light, a loudspeaker, or a heater (which may include a fan for blowing hot air from the heater) in addition to or instead of a fan. For such payloads it may also be advantageous, as in the case of the fan, to aim the payload at the user, and to adjust an operating parameter of the payload 105, such as the level of operation (e.g., the brightness of a light, or the volume of the loudspeaker), in accordance with the distance to the user. In some embodiments, the support for the payload, which allows the payload to be actively aimed by the one or more pointing control actuators 125, may be a (flexible) gooseneck instead of one or more bearings or hinges. In such an embodiment, two linear actuators may be used to control the aiming of the payload. In embodiments in which the position of the payload is to be controlled, in addition to the aiming of the payload, additional linear actuators may be used to control the additional degrees of freedom. For example, in some embodiments, a Stewart platform may be used to actuate all six degrees of freedom of the payload.

In some embodiments, the system includes a pointing control actuator 125 for rotating the payload 105 in elevation (i.e., about a horizontal axis) instead of, or in addition to, a pointing control actuator 125 for rotating the payload 105 in azimuth. Such a pointing control actuator 125 may also be connected to and driven by a (respective, or common) pointing-control circuit 120. The ability to follow the user 100 in elevation may be advantageous, for example, if the user is climbing or descending a ladder, or if the system is installed at a different height from that of the user (e.g., if the system is ceiling mounted).

In some embodiments, the user-tracking circuit 115 is configured to determine the distance to the user, and it may adjust the level of operation of the payload based on the distance (e.g., it may increase the fan speed when the user is more distant). The level of operation of the payload may be continuously adjustable, or it may be adjustable in increments (e.g., the fan may be capable of operating at, e.g., twelve different speeds). As used herein, "adjusting the level of operation", or "reducing the level of operation" of a payload means, for example, adjusting the speed of a fan, the brightness of a light, or the volume of a loudspeaker, and includes shutting the payload off entirely. In some embodiments, the system 110 may shut off the payload when the signal from the user device 130 becomes sufficiently weak or is no longer detected.

In some embodiments, the system 110 is capable of tracking more than one user 100 (e.g., two users 100). In such an embodiment, the user-tracking circuit 115 may be capable of tracking, e.g., two users, and the system may cause the payload to point, alternately, to the first user and to the second user. In some embodiments, the system 110 is capable (unlike some oscillating fans which have a linkage providing a limited range of motion) of causing the payload to rotate a full 360 degrees. In some embodiments, the system 110 includes one or more position actuators (e.g., powered wheels) 140 that may be driven by a position control circuit 145, enabling the system to follow the user, e.g., to move so as to reduce the distance to the user. In some embodiments, the system 110 is powered through a retractable power cord, or by a rechargeable battery. In some embodiments, the system 110 includes, or is connected to, a voice assistant (e.g., a circuit including a microphone and capable of recognizing voice commands from a user).

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the word "or" is inclusive, so that, for example, "A or B" means any one of (i) A, (ii) B, and (iii) A and B.

In some embodiments, various circuits described herein are or include one or more processing circuits, or one or more processing circuits together with interface circuits such as analog to digital converters, digital to analog converters, radio transmitters and radio receivers. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

Although exemplary embodiments of a system for adjusting a piece of equipment for a user have been specifically described and illustrated herein, many modifications and variations will be apparent to those skilled in the art. Accordingly, it is to be understood that a system for adjusting a piece of equipment for a user constructed according to principles of this disclosure may be embodied other than as specifically described herein. The invention is also defined in the following claims, and equivalents thereof.

What is claimed is:
1. A system, comprising:
 a user-tracking circuit, configured to determine a direction to a first user; and
 a pointing control circuit, for causing a payload to be aimed based on the direction to the first user, wherein the pointing control circuit is configured:
  to cause a clutch to engage and to cause the payload to oscillate when a difference between the direction to the first user and the current direction in which the payload is aimed exceeds a first threshold, and to cause the clutch to disengage when the difference between the direction to the first user and the current direction in which the payload is aimed falls below a second threshold.

2. The system of claim 1, wherein the payload comprises an oscillating fan, wherein the oscillating fan comprises:
a fan motor; and
a pointing drive gear mechanically connected to the fan motor through the clutch,
wherein the pointing control circuit is configured to cause the clutch to be engaged or disengaged.

3. The system of claim 1, further comprising a first pointing control actuator electrically connected to the pointing control circuit and mechanically connected to the payload, wherein the first pointing control actuator is configured to rotate the payload about a first axis.

4. The system of claim 3, wherein:
the user-tracking circuit is further configured to determine a direction to a second user; and
the pointing control circuit is further configured to cause the payload to be aimed, alternately, based on the direction to the first user and based on the direction to the second user.

5. The system of claim 3, further comprising a command receiving circuit, and an operation control circuit,
wherein the command receiving circuit is configured to receive a command from the first user, and
the operation control circuit is configured to control an operating parameter of the payload.

6. The system of claim 5, wherein:
the payload comprises a fan, and
the operating parameter is a speed of the fan.

7. The system of claim 5, wherein the user-tracking circuit is configured to determine a direction to a user device held by the first user.

8. The system of claim 7, wherein the operation control circuit is configured to reduce a level of operation of the payload when no signal is detected from the user device.

9. The system of claim 7, further comprising the user device, wherein the user device is a smart phone.

10. The system of claim 7, wherein the user-tracking circuit is configured to detect electromagnetic radiation emitted by the user device.

11. The system of claim 10, wherein the electromagnetic radiation is radio-frequency or microwave radiation.

12. The system of claim 11, wherein the electromagnetic radiation is configured to transport data.

13. The system of claim 12, wherein the user-tracking circuit is configured to receive, in the data, a location of the user.

14. The system of claim 3, wherein the user-tracking circuit is further configured to determine a distance to the first user.

15. The system of claim 14, further comprising a position control circuit and a position actuator, wherein the position control circuit is configured to cause the position actuator to move the system to reduce the distance to the first user.

16. The system of claim 3, further comprising a battery configured to power the system.

17. The system of claim 3, further comprising a microphone and a voice-processing circuit for receiving voice commands.

18. A system, comprising:
a fan comprising a fan motor and a fan blade;
a user-tracking circuit;
a pointing control circuit;
a pointing control actuator;
a clutch;
a clutch control actuator;
a worm gear drive; and
a user device;
wherein:
the user device is configured to emit a first signal to the user-tracking circuit;
the user-tracking circuit is configured:
to detect the first signal from the user device,
to determine a direction of a first user, and
to transmit a difference between the direction to the first user and a current direction in which the fan is aimed to the pointing control circuit,
to adjust a speed of the fan, in increments, based on a distance to the first user, and
to reduce a level of operation of the fan when no signal is detected from the user device;
the fan motor is connected, through the clutch, to the worm gear drive;
an output of the worm gear drive is connected, through a first linkage, to the fan;
the clutch control actuator comprises a first gear motor connected to the clutch by a second linkage;
the pointing control circuit is electrically connected to the clutch control actuator and configured:
to cause the clutch control actuator to cause the clutch to engage and to cause the fan to oscillate when the difference between the direction to the first user and the current direction in which the fan is aimed exceeds a first threshold, and
to cause the clutch control actuator to cause the clutch to disengage when the difference between the direction to the first user and the current direction in which the fan is aimed falls below a second threshold; and
the pointing control actuator comprises a second gear motor configured rotate the fan in elevation.

* * * * *